US006957264B1

(12) United States Patent
Jacobs

(10) Patent No.: US 6,957,264 B1
(45) Date of Patent: Oct. 18, 2005

(54) METHOD AND APPARATUS FOR SELECTING INTERNET-BASED BROADCAST SOURCES

(75) Inventor: Robert A. Jacobs, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 809 days.

(21) Appl. No.: 09/593,922

(22) Filed: Jun. 13, 2000

(51) Int. Cl.[7] ............................ G06F 15/16; H04J 3/02
(52) U.S. Cl. ........................ 709/231; 709/234; 370/537
(58) Field of Search ............................ 710/306, 52, 53; 709/231, 203, 233, 234

(56) References Cited

U.S. PATENT DOCUMENTS

| | | | | |
|---|---|---|---|---|
| 6,195,680 | B1 * | 2/2001 | Goldszmidt et al. | 709/203 |
| 6,470,392 | B1 * | 10/2002 | Murase et al. | 709/231 |
| 6,557,067 | B1 * | 4/2003 | James et al. | 710/306 |
| 6,633,961 | B2 * | 10/2003 | Takada et al. | 711/154 |
| 6,754,239 | B2 * | 6/2004 | Negishi et al. | 370/537 |
| 6,769,028 | B1 * | 7/2004 | Sass et al. | 709/231 |

FOREIGN PATENT DOCUMENTS

WO WO 9955092 A2 * 10/1999 ............ H04N 7/24

* cited by examiner

*Primary Examiner*—William A. Cuchlinski, Jr.
*Assistant Examiner*—Michael Delgado
(74) *Attorney, Agent, or Firm*—Marger Johnson & McCollom, P.C.

(57) ABSTRACT

A method and apparatus to quickly change and deliver Internet radio sources. The apparatus can receive multiple Internet radio sources simultaneously, and route each of the multiple Internet radio sources to a stream receiver. The stream receiver is operable to maintain connection with one of a multitude of Internet radio sources. Each of the sources can be buffered by a stream buffer that can receive data from one of each of the stream receivers. A stream selector can select one of the multiple Internet radio sources and deliver the selected one of the multiple Internet radio sources as output to a user. The apparatus can be implemented as part of a multiple function system such as a personal computer or as an Internet radio receiver apparatus.

16 Claims, 2 Drawing Sheets

METHOD AND APPARATUS FOR SELECTING INTERNET-BASED BROADCAST SOURCES

BACKGROUND

1. Field

This disclosure relates to control of Internet-based, broadcast source reception, and more particularly to a method and apparatus that allows quick selection of these radio stations.

2. Background

Numerous Internet-based broadcast sources have come into existence recently. Additionally, numerous broadcast radio stations have begun to provide substantially simultaneous broadcast over the Internet. These broadcast sources may be referred to as Internet radio stations, even though they do not use radio waves to broadcast across the Internet. Currently, users may listen to these stations over the sound system in their personal computers, using one of several audio players. Examples of these audio players include Real Player™ software from RealNetworks, Inc. and Microsoft Windows® MediaPlayer™ software from Microsoft Corporation. These particular players, as well as others, have versions that may be freely downloaded from the companies' sites.

In addition to the player software, lists of available broadcast stations may be easily accessed from the Internet. Some companies that provide player software also provide lists of stations. Others are independent of the players, but have links to the various players from their sites.

To use these players, the user typically accesses the Internet and locates a station to which he or she wants to listen. The user selects the link and the appropriate player launches and buffers the audio stream. This process may take up to two minutes, depending upon the system and connection speeds, employing typical state-of-the-art technology.

If an interruption occurs, the user repeats this process. This may or may not involve re-launching the browser. However, the user typically selects another link and waits while the player buffers up the next selection. This problem hinders Internet broadcasts from having wider user acceptance, including acceptance of Internet "radio" products.

BRIEF DESCRIPTION OF THE DRAWINGS

The invention may be best understood by reading the disclosure with reference to the following drawings, wherein.

DETAILED DESCRIPTION

Internet broadcast sources have become more prevalent recently, a trend that will likely continue. The term Internet radio sources include those that are transmitted only over the Internet as well as those that are available over the Internet and by traditional broadcasts. Similarly, the term Internet is used because it easily identifies the current worldwide network of computers that communicates using a defined protocol. As used in this discussion, the term Internet will also apply to any network of computer or computing platforms capable of utilizing email and/or a browser.

Figure 1:
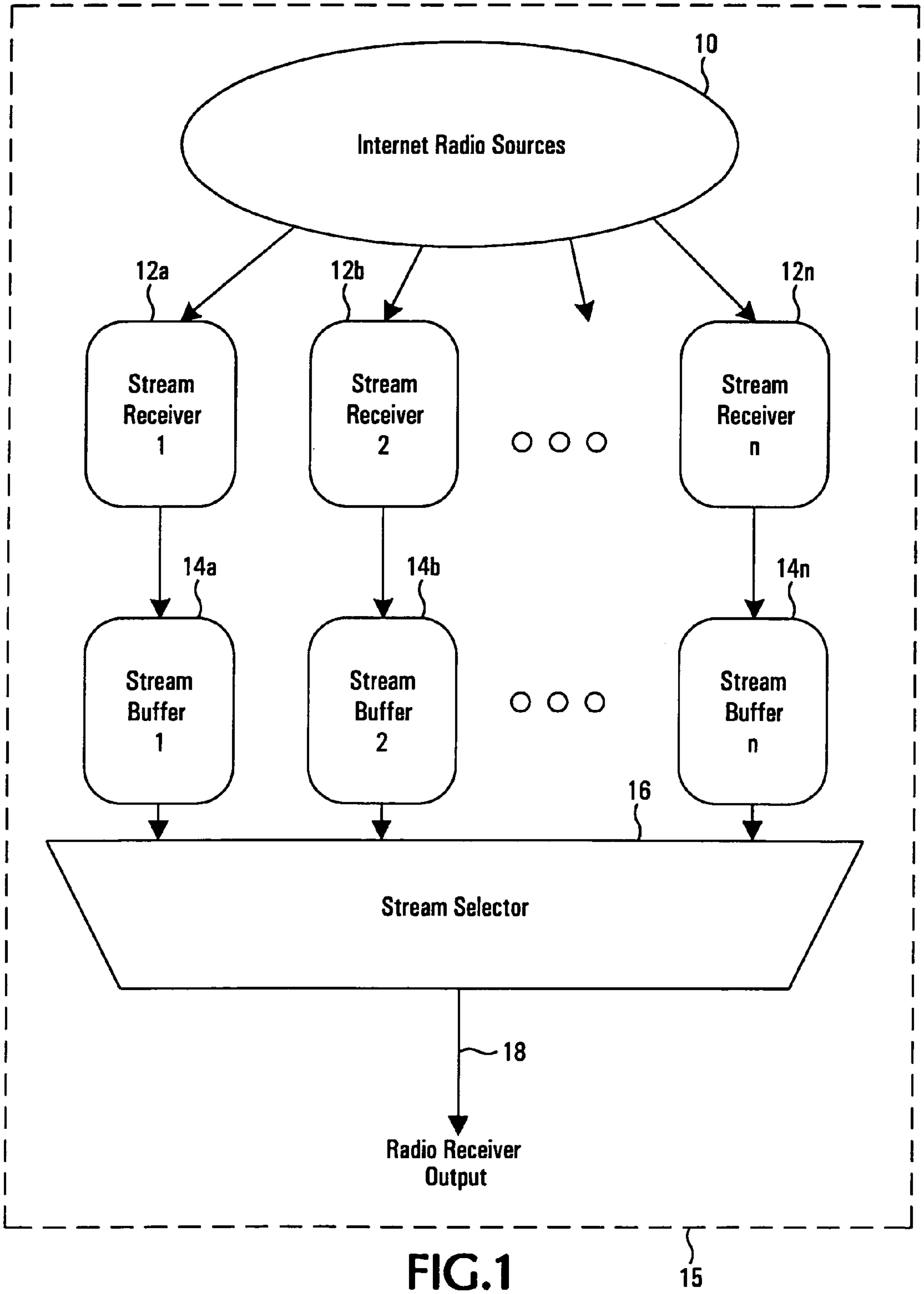
FIG. 1 shows a block diagram of an embodiment of an apparatus for Internet radio reception in accordance with the invention.

One embodiment of an apparatus operable to receive and deliver Internet radio sources to a user is shown in FIG. 1. This apparatus 15, shown by the dashed box, will be referred to as a stream manager. The Internet radio sources 10, as defined above, are received by the apparatus across the Internet. The sources are then routed to their own respective stream receiver, 12*a*, 12*b* . . . 12*n*. A stream receiver maintains a connection with one of the multiple Internet radio sources.

The mechanics of maintaining the connection may be done in several ways. One embodiment of the stream manager apparatus of FIG. 1 is best implemented as multi-threaded software. Multi-threaded software as used here is software that can do several things at once. The software operates to identify the data received from the Internet as belonging to one of the radio stations and then routing that data through the thread for that station. It performs this routing for each of the identified stations. However, the invention is not limited to one particular approach.

Corresponding stream buffers 14*a*, 14*b* . . . 14*n* store the respective streams. The stream buffers operate as 'bit buckets,' storing the last interval of the stream of data from the receiver for that source. The interval would typically be a time interval such as, for example, the previous x seconds of the transmission. This allows stream selector 16 to change sources without the typical pause in the transmissions that occurs in current audio players used for Internet radio.

The memory used for the stream buffers may be implemented in several ways and the invention is not limited in scope to a particular approach. For example, in a current personal computer comprising a central processing unit and storage devices, such as hard disk drives and random access memory (RAM), the buffers may be implemented as segments of the RAM. The software may direct the processor to store and retrieve the appropriate stream from the appropriate section of the RAM. In one implementation of memory for the stream buffers, however, the buffers allow the stream selector to present the selected source to the user with little, if any, perceptible pause in audio output signal.

The streams to be buffered may be identified in several ways and the invention is not limited in scope to a particular approach. Preferably, the user may designate several "favorites" and these may be buffered to reduce or avoid delays in transmission. Alternatively, the user may designate a radio format, or some other characteristic that will allow identification of the streams to be buffered.

The stream selector 16 operates to select which of the buffered streams will be presented to the user as audio output signals 18. The stream selector may make the selection based on a predefined list of user preferences, as mentioned above, in which the stations are prioritized. The prioritization may be based upon user preferences prioritized depending upon the time of day, as an example. Alternatively, the stream selector may employ present user input information. For example, the user may listen to one of the stations and desire to change to another station because of a commercial, the start of an unwanted program or other reason. The user may designate another selected station and the stream selector would operate select the appropriate stream.

In this embodiment of multi-threaded software, the software may identify the selected source from user input information. The software may then identify which thread and corresponding buffer is receiving and storing the data for that source. The software may then route the data for that source to the system output port or channel.

Figure 2:
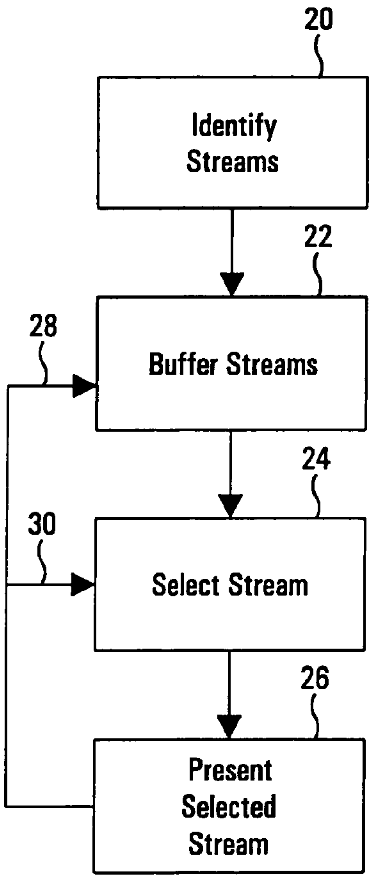
FIG. 2 shows a flow chart of an embodiment of a process of operating an Internet radio receiver in accordance with the invention.

An embodiment of a method of operation in accordance with the invention is shown in FIG. 2. At 20, the streams are identified, as discussed above, and buffered at 22. The selection of the stream to be output is made at 24 and that stream is presented to the user at 26. If an interruption occurs, such as from user input information, a loss in transmission, or a loss of connection, as examples, the process returns to 22 or 24, via paths 28 or 30, respectively. In this embodiment, the process would just return to the selection at 24 and the interrupted stream becomes a buffered stream that is not selected as the audio output signal. However, it is possible that the user input could be selection of a new source that is not one of the sources already buffered, returning the process to 22.

In this last example, the advantage of quickly switching stations would be lost on the initial identification of a new source, but would be recovered upon subsequent switches involving that station. It is noted that the number of stations identified may be limited only by the system non-volatile memory capacity and the speed of the processor in executing the instructions of the software.

Figure 3:
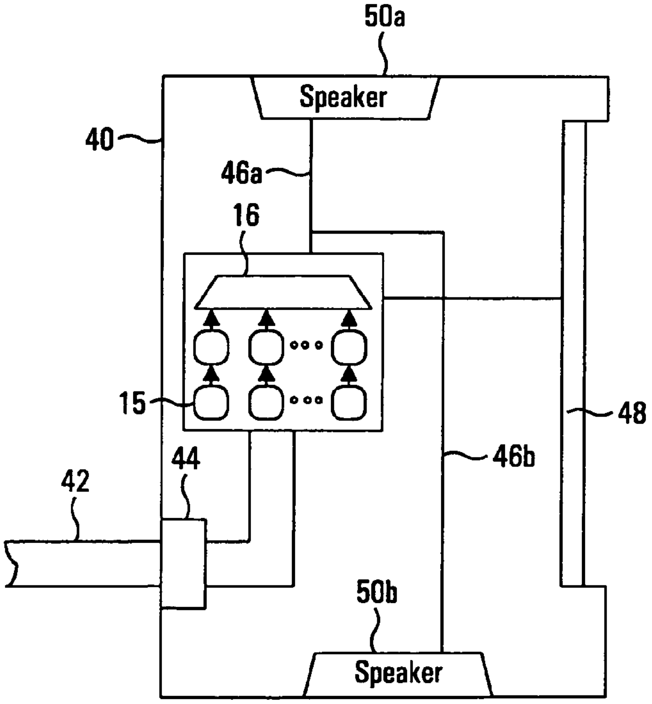
FIG. 3 illustrates an embodiment of an Internet radio receiver including a stream selector in accordance with the invention.

The processor and memory for implementing the stream manager may be contained in any one of a number of system configurations. As an example, a personal computer has been discussed above. In addition, a dedicated apparatus such as an Internet radio receiver may implement the stream manager. Such an apparatus may be considered analogous to a typical personal radio or a 'boom box' currently available today. For ease of discussion, and with no intent to limit application of the invention, this embodiment will be referred to as an Internet radio receiver. An example of such a receiver is shown in FIG. 3.

In this embodiment, radio receiver 40 receives data from the Internet radio sources at 42. The Internet port 42 could be a cable, such as a modem or network cable, or a wireless connection. The data is then handled by the interface 44 in this embodiment. The interface may depend upon the type of Internet connection used. In the case of a modem cable, the interface comprises a modem. In the case of a network cable, the interface comprises a network interface, such as an Ethernet card. If the connection is wireless, the connection comprises a wireless receiver and the interface comprises a wireless modem, such as a Bluetooth™ adapter or other manager for wireless connection. If the connection is a power-line data connection, the interface would be a power-line data interface.

The receiver in this embodiment includes the stream manager 15, which includes the stream selector 16. The selected one of the Internet radio sources would be provided as audio output signals from the stream selector, as indicated by 46*a* and 46*b*. These would in turn provide audio output signals to the user by speakers 50*a* and 50*b*. In addition, a representation of the selected Internet radio source may be displayed on the display 48, such as a liquid crystal display. Two speakers are shown here, but one speaker, or more than two, depending upon the user's preference, may be employed in alternative embodiments.

If the stream manager were implemented on a personal computer, similar functionality could be provided to the user. In either case, as well as any other example, the computing device upon which the stream manager executes is able to access and read the computer readable media containing the program code. The program code allows the apparatus to receive and deliver Internet radio sources to a user according to the processes and methods set forth above.

Thus, although there has been described to this point a particular embodiment for a method and structure for an Internet radio stream manager, it is not intended that such specific references be considered as limitations upon the scope of this invention except in-so-far as set forth in the following claims.

What is claimed is:

1. A method to change audio sources broadcast over a network, the method comprising:

separately buffering multiple audio streams within one device, wherein each audio streams is transmitted across the network from a different audio source having different content than other of the audio streams and the audio streams are selected for buffering based upon user input; and routing each of the multiple audio streams to a stream receiver in the device to maintain connection with the audio sources from which the streams came.

2. The method of claim 1, the method further comprising selecting one of the multiple audio streams using a stream selector in the device.

3. The method of claim 1, the method further comprising delivering the selected one of the multiple audio streams as audio output signals to a user.

4. The method of claim 1 wherein buffering of the multiple audio streams is accomplished by one of the group comprised of: a computer having browsing software, and an Internet radio receiver.

5. The method of claim 1 wherein the user input is one of either a present user input or user preferences.

6. An Internet radio receiver operable to switch between multiple audio sources and deliver radio receiver output to a user, the receiver comprising:

a stream manager operable to:

receive and buffer multiple audio streams each from a different Internet radio sources within one device, wherein streams are selected for buffering based upon user inputs;

select one of the multiple Internet radio sources; and a stream receiver operable to receive each of the multiple audio streams and to maintain connection with the audio sources from which the streams came.

7. The receiver of claim 6 wherein the receiver further comprises a connector operable to communicate with the multiple Internet radio sources.

8. The receiver of claim 7, wherein the connector is one of a group comprised of: a modem cable, a wireless receiver, a power line, and a network cable.

9. The receiver of claim 8 wherein the receiver further comprises an interface between the connector and the stream manager.

10. The receiver of claim 9, wherein the interface is one of a group comprised of a modem, a network interface card, a power line data interface and a wireless modem.

11. The receiver of claim 6 further comprising at least one speaker operable to present the one of the multiple audio sources to a user as audio output signals.

12. The receiver of claim 6 further comprising a display operable to display an identifier of a selected one of the multiple audio sources.

13. The receiver of claim 6 wherein the stream receiver further comprises:

multiple stream receivers in one device each operable to receive one of the multiple audio streams;

corresponding stream buffers in the device each operable to receive data from one of the multiple stream receivers;

a stream selector operable to select one of the multiple audio sources as output to a user.

14. An article comprising:

a storage medium, the storage medium having stored thereon instructions, that, when executed by a computing device, result in:

reception of multiple audio streams from different audio sources;

routing each of the multiple audio streams to a stream receiver in the device to maintain connection with the audio sources from which the streams came;

buffering of the multiple audio streams within one device received from the stream receivers based upon user inputs; and selection of one of the multiple audio sources and to produce audio output signals from the device.

15. The article of claim 14 wherein said computing device comprises a personal computer.

16. The article of claim 14 wherein said computing device comprises an Internet radio receiver having a processor.

* * * * *